United States Patent
Yang

(10) Patent No.: US 7,903,440 B2
(45) Date of Patent: *Mar. 8, 2011

(54) SYNCHRONOUS REGULATION CIRCUIT AND METHOD FOR PROVIDING SYNCHRONOUS REGULATION FOR POWER CONVERTERS

(75) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 465 days.

This patent is subject to a terminal disclaimer.

(21) Appl. No.: 11/984,858

(22) Filed: Nov. 23, 2007

(65) Prior Publication Data

US 2009/0135631 A1 May 28, 2009

(51) Int. Cl.
*H02M 7/217* (2006.01)
(52) U.S. Cl. .......................... 363/89; 363/127
(58) Field of Classification Search .............. 363/89, 363/127
See application file for complete search history.

(56) References Cited

U.S. PATENT DOCUMENTS

| | | | |
|---|---|---|---|
| 4,855,888 A | | 8/1989 | Henze et al. |
| 5,289,359 A | * | 2/1994 | Ziermann ................. 363/21.11 |
| 5,442,540 A | | 8/1995 | Hua et al. |
| 5,757,627 A | * | 5/1998 | Faulk ...................... 363/21.14 |
| 6,459,600 B2 | * | 10/2002 | Farrington et al. ............ 363/89 |
| 6,490,179 B1 | * | 12/2002 | Boylan et al. .............. 363/21.06 |
| 6,490,183 B2 | * | 12/2002 | Zhang .............................. 363/89 |
| 6,504,739 B2 | * | 1/2003 | Phadke ........................ 363/127 |
| 6,535,400 B2 | * | 3/2003 | Bridge ....................... 363/21.06 |
| 6,671,193 B1 | * | 12/2003 | Pelkonen ........................ 363/53 |
| 6,744,649 B1 | | 6/2004 | Yang et al. |
| 7,173,835 B1 | | 2/2007 | Yang |
| 7,660,136 B2 | * | 2/2010 | Yang .......................... 363/21.06 |
| 2009/0135631 A1 | * | 5/2009 | Yang ................................ 363/89 |
| 2009/0141521 A1 | * | 6/2009 | Yang ................................ 363/49 |
| 2009/0213623 A1 | * | 8/2009 | Yang ................................ 363/49 |

* cited by examiner

*Primary Examiner* — Jeffrey L Sterrett
(74) *Attorney, Agent, or Firm* — Rosenberg, Klein & Lee

(57) ABSTRACT

A synchronous regulation circuit is provided to improve the efficiency of the power converter. A primary-side switching circuit generates a synchronous signal and a switching signal. The switching signal is used for soft switching a transformer. A secondary-side switching circuit is coupled to the output of the power converter to generate a pulse signal in response to the synchronous signal and the output voltage of the power converter. The pulse signal is a differential signal generated for the rectifying and the regulation of the power converter. A synchronous switch includes a power switch and a control circuit. The control circuit receives the pulse signal for turning on/off the power switch. The power switch is connected in between the transformer and the output of the power converter. Furthermore, a flyback switch is operated as a synchronous rectifier to freewheel the inductor current of the power converter. The flyback switch is turned on in response to the off of the power switch. The on time of flyback switch is programmable and correlated to the on time of the power switch.

17 Claims, 17 Drawing Sheets

SYNCHRONOUS REGULATION CIRCUIT AND METHOD FOR PROVIDING SYNCHRONOUS REGULATION FOR POWER CONVERTERS

BACKGROUND OF THE INVENTION

1. Field of Invention

The present invention relates to power converters, and more particularly, to the control of power converters.

2. Description of Related Art

An offline power converter includes a power transformer is to provide isolation from AC line input to the output of the power converter for safety. In recent development, using soft switching topologies in the primary side of the transformer and applying the synchronous rectifier in the secondary side of the transformer are to reach a higher efficiency conversion for power converters. Among them, the full-bridge quasi-resonant ZVS techniques are described in "Constant frequency resonant power converter with zero voltage switching" by Christopher, P. Henze, et al, U.S. Pat. No. 4,855,888; "Soft-switching PWM converters" by Guichao C. Hua and Fred C. Lee, U.S. Pat. No. 5,442,540; "Zero switching power converter operable as asymmetrical full-bridge converter" by Yang, et al, U.S. Pat. No. 6,744,649. The drawback of foregoing power converters is that the pulse width of the switching signal is too short to achieve the soft switching at light load. The insufficient circular power causes hard switching and low efficiency. Equip the synchronous rectifier at the secondary side of the transformer to reduce the power loss of the diode. The detail operation of the synchronous rectifying can be found in a prior art of "Control circuit associated with saturable inductor operated as synchronous rectifier forward power converter" by Yang, U.S. Pat. No. 7,173,835. However, extra devices such as saturable inductors and current-sense resistor cause additional power consumptions. The object of present invention is to integrate the synchronous rectifying circuit with the regulation circuit to achieve higher efficiency. No further switching stage is needed. The primary-side switching circuit, the secondary-side synchronous rectifier and the regulation circuit achieve high efficiency power conversion from no load to full load.

SUMMARY OF THE INVENTION

A synchronous regulation circuit is developed to improve the efficiency of the power converter. It includes a primary-side switching circuit, a secondary-side switching circuit, a synchronous switch and a flyback switch. The primary-side switching circuit generates a switching signal and a synchronous signal. The switching signal is coupled to switch a transformer. The synchronous signal is coupled from the primary-side switching circuit to the secondary-side switching circuit through an isolation device. The secondary-side switching circuit is coupled to the output of the power converter to generate a pulse signal in response to the synchronous signal and a feedback signal. The feedback signal is correlated to the output of the power converter. The pulse signal is generated for the rectifying and the regulating of the power converter. The synchronous switch includes a power switch and a control circuit. The power switch is coupled in between the secondary side of the transformer and the output of the power converter. The control circuit is operated to receive the pulse signal for turning on/off the power switch. The polarity of the pulse signal determines the on/off the power switch. The flyback switch is connected to the synchronous switch and the ground of the output of the power converter. The flyback switch is turned on in response to the off of the power switch. The on time of flyback switch is programmable and is correlated to the on time of the power switch.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 is a preferred embodiment of a power converter having a synchronous regulation circuit according to the present invention.

DETAILED DESCRIPTION OF PREFERRED EMBODIMENTS

Figure 1:
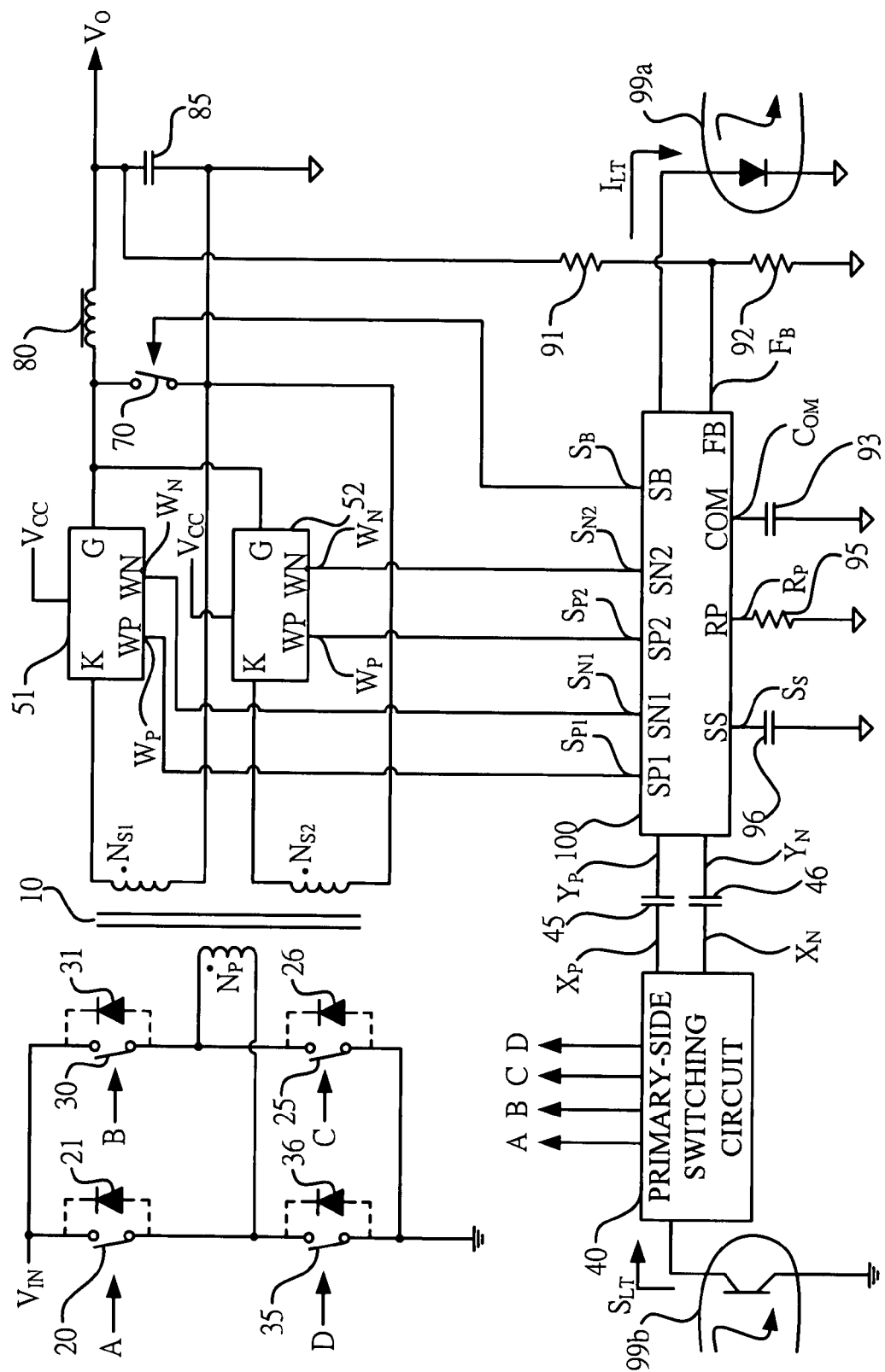

FIG. 1 shows a preferred power converter with synchronous regulation circuit. The power converter includes a transformer 10 having a primary side and a secondary side. At the primary side, a primary winding $N_P$ of the transformer 10 is connected to four power switches 20, 25 and 30, 35 for switching the transformer 10. The power switches 20, 30 are coupled to an input voltage $V_{IN}$. The power switches 25, 35 are coupled to the ground. A primary-side switching circuit 40 generates switching signals A, B, C, D and synchronous signals $X_P/X_N$. Switching signals A, B, C, D are coupled to switch the primary winding $N_P$ of the transformer 10. The secondary side of the transformer 10 includes a first secondary winding $N_{S1}$ and a second secondary winding $N_{S2}$. Switching voltages are produced across the secondary windings $N_{S1}$ and $N_{S2}$ in response to the switching of the transformer 10.

A first synchronous switch 51 has a terminal K connected to the first secondary winding $N_{S1}$. The terminal G of the first synchronous switch 51 is connected to the ground of the output terminal of the power converter. A power source $V_{CC}$ is coupled to the first synchronous switch 51. The terminal K of a second synchronous switch 52 is connected to the second secondary winding $N_{S2}$. The terminal G of the second synchronous switch 52 is also connected to the ground of the output terminal of the power converter. The power source $V_{CC}$ is coupled to the second synchronous switch 52. The synchronous switch, such as the synchronous switches 51 and 52, include a power switch and a control circuit. The power switch is coupled in between the terminal K and the terminal G. The control circuits of the synchronous switches 51 and 52 are operated to receive pulse signals $S_{P1}/S_{N1}$ or $S_{P2}/S_{N2}$ respectively to generate pulse signals $W_P/W_N$ for turning on/off the power switches of the synchronous switches 51 and 52.

The first synchronous switch 51 is coupled to a secondary-side switching circuit 100 to receive the pulse signals $S_{P1}/S_{N1}$ from the terminals $S_{P1}$ and $S_{N1}$, and generate pulse signals $W_P/W_N$ at the terminal WP and WN. The second synchronous switch 52 is also connected to the secondary-side switching circuit 100 to receive the pulse signals $S_{P2}/S_{N2}$ from the terminal SP2 and SN2, and generate pulse signals $W_P/W_N$ at the terminal WP and WN. The secondary-side switching circuit 100 is coupled to the output terminal of the power converter to generate the pulse signals $S_{P1}/S_{N1}$ and $S_{P2}/S_{N2}$ in response to synchronous signals $Y_P/Y_N$ and a feedback signal $F_B$ from a terminal FB. The feedback signal $F_B$ is coupled to the output terminal of the power converter via resistors 91 and 92. The feedback signal $F_B$ is thus correlated to the output voltage $V_O$ of the power converter. An output capacitor 85 is coupled to the output terminal of the power converter and the ground. Synchronous signals $Y_P/Y_N$ are generated by the synchronous signals $X_P/X_N$ via isolation devices, such as capacitors 45, 46. Capacitors 45 and 46 are coupled from the primary-side switching circuit 40 to the secondary-side switching circuit 100. Pulse signals $S_{P1}/S_{N1}$ and $S_{P2}/S_{N2}$ are thus generated for rectifying and regulating of the power converter. The polarity of the pulse signals $S_{P1}/S_{N1}$ and $S_{P2}/S_{N2}$ determine the on/off of power switches.

An inductor 80 is coupled from the first secondary winding $N_{S1}$ and the second secondary winding $N_{S2}$ to the output $V_O$ of the power converter. A flyback switch 70 is coupled to the synchronous switches 51 and 52 through the secondary windings $N_{S1}$ and $N_{S2}$ respectively. The flyback switch 70 is further connected to the ground of the output terminal of the power converter to freewheel the switching current of the inductor 80. The flyback switch 70 is also coupled to the power switch and the output of the power converter. A terminal SB of the secondary-side switching circuit 100 generates a drive signal $S_B$ to control the flyback switch 70. The flyback switch 70 is turned on in response to the off of the power switch. The on time of the flyback switch 70 is programmable and correlated to the on time of the power switch.

Furthermore, the secondary-side switching circuit 100 generates a light-load signal $I_{LT}$ coupled to an optical coupler 99 (99a). The optical coupler 99 (99b) produces an on/off signal $S_{LT}$ coupled to the primary-side switching circuit 40 to disable switching signals A, B and synchronous signals $X_P/X_N$ during the light load of the power converter in response to the light-load signal $I_{LT}$. The light-load signal $I_{LT}$ is used for power saving and the output voltage regulation. A capacitor 93 is connected to an output terminal COM of the secondary-side switching circuit 100 for the loop compensation. A capacitor 96 is coupled to a terminal SS of the secondary-side switching circuit 100 for the soft start. A resistor 95 is coupled to a terminal RP of the secondary-side switching circuit 100 to program the on time of the flyback switch 70.

Figure 2:
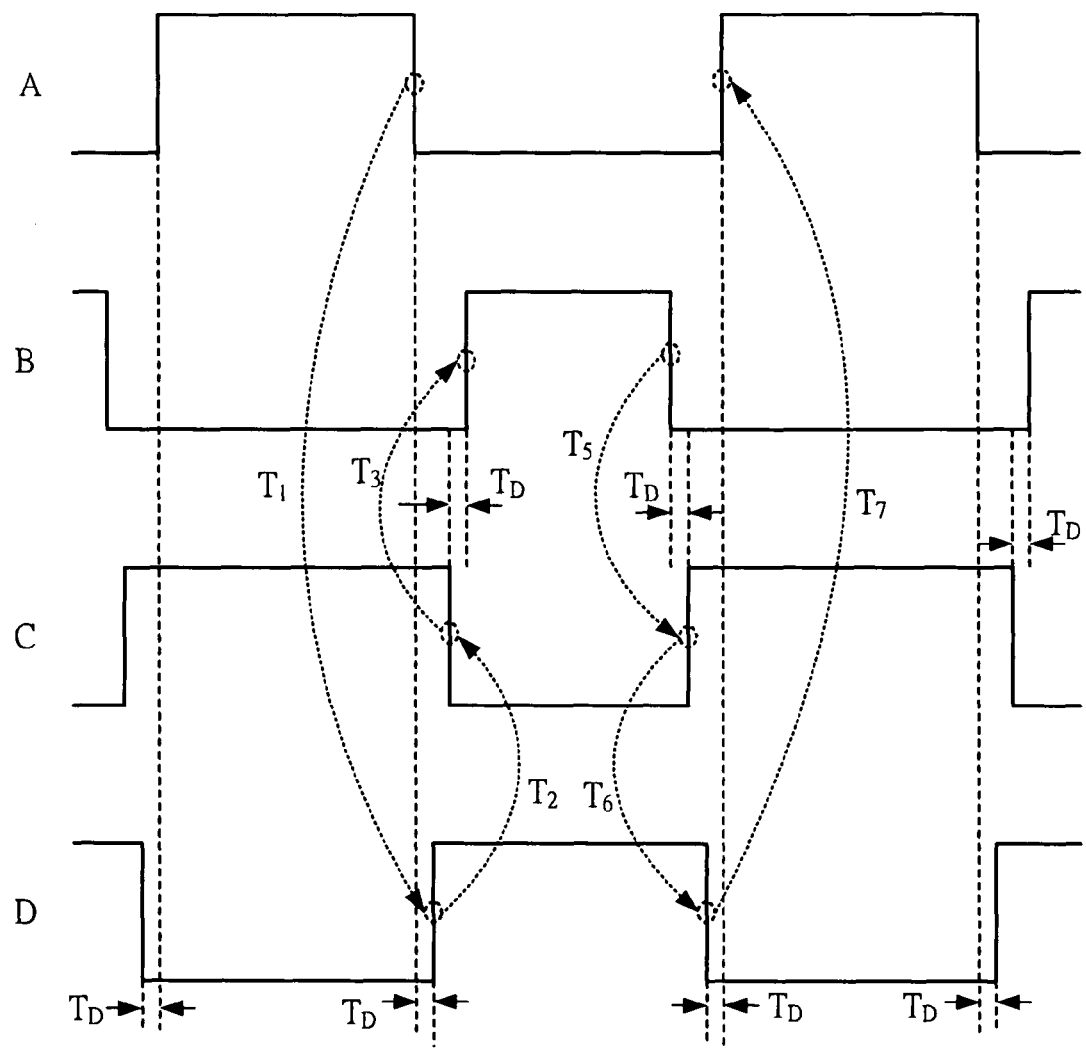
FIG. 2 shows soft switching signal waveforms according to the present invention.

FIG. 2 shows waveforms of the switching signals A, B, C, D. Referring FIG. 1 and FIG. 2 together. The $T_1$ stage shows the switching signal D is turned on after a delay time $T_D$ once the switching signal A is turned off. The circular current produced by the leakage inductance $L_{PL}$ of the primary winding $N_P$ of the transformer 10 will turn a diode 36 on, which will result a soft switching on the power switch 35. The leakage inductance $L_{PL}$ and the parasitic capacitance $C_J$ of the power switches 20,30,35,25 form a resonant tank. Its resonant frequency is $$F_R = \frac{1}{2\pi\sqrt{L_{PL} \times C_J}} \tag{1}$$

The delay time $T_D$ is used to achieve the phase shift for soft switching is given by, $$T_D = 1/(4 \times F_R) \tag{2}$$

The switching signal C is turned off at $T_2$ stage. The switching signal B is turned on after another delay time $T_D$, therefore the power switch 30 can achieve soft switching after the diode 31 is turned on ($T_3$ stage). The T5 stage shows the switching signal C is turned on after the delay time $T_D$ once the switching signal B is turned off. The circular current will turn on a diode 26 before switching on the power switch 25. The switching signal D is turned off at $T_6$ stage. The switching signal A is turned on after the delay time $T_D$, therefore the power switch 20 can achieve soft switching after the diode 21 is turned on ($T_7$ stage).

Figure 3:
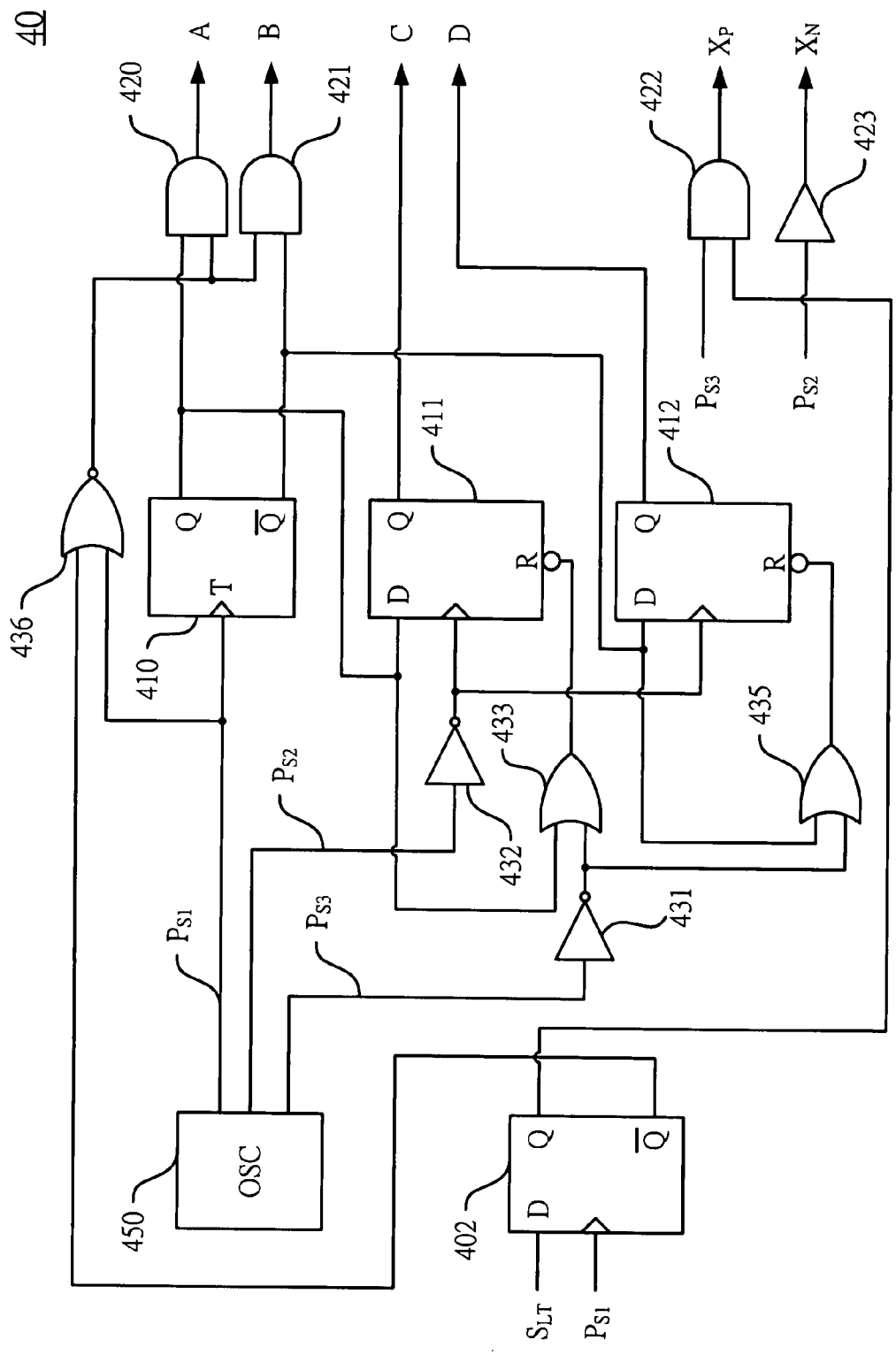
FIG. 3 is the circuit schematic of a primary-side switching circuit according to the present invention.

FIG. 3 is the circuit schematic of the primary-side switching circuit 40. An oscillation circuit 450 generates oscillation signals $P_{S1}$, $P_{S2}$ and $P_{S3}$. The oscillation signal $P_{S1}$ is connected to a T-flip-flop 410 for the divide-by-two. The output terminals Q and /Q of the T-flip-flop 410 are connected to AND gates 420 and 421 to generate switching signals A and B respectively. Another input terminals of the AND gates 420 and 421 are coupled to the oscillation signal $P_{S1}$ through a NOR gate 436. An output terminal of the NOR gate 436 is coupled to the input terminals of the AND gates 420 and 421. An input terminal of the NOR gate 436 is coupled to the oscillation signal $P_{S1}$. The oscillation signal $P_{S1}$ limits the maximum on time of switching signals A and B. The oscillation signal $P_{S2}$ is connected to enable D-flip-flops 411 and 412 via an inverter 432. The input terminals D of the D-flip-flops 411 and 412 are respectively connected to the output terminals Q and /Q of the T-flip-flop 410.

The output terminal Q of the D-flip-flop 411 generates the switching signal C. The output terminal Q of the D-flip-flop 412 produces the switching signal D. The oscillation signal $P_{S3}$ is coupled to reset the D-flip-flop 411 through an inverter 431 and an OR gate 433. An output terminal of the OR gate 433 is coupled to a reset input terminal R of the D-flip-flop 411. The inverter 431 is coupled between the oscillation signal $P_{S3}$ and an input terminal of the OR gate 433. Another input terminal of the OR gate 433 is controlled by the Q output terminal of the T-flip-flop 410. The oscillation signal $P_{S3}$ is further coupled to reset the D-flip-flop 412 through the inverter 431 and an OR gate 435. An output terminal of the OR gate 435 is coupled to a reset terminal R of the D-flip-flop 412. The output terminal of the inverter 431 is also coupled to an input terminal of the OR gate 435. Another input terminal of the OR gate 435 is connected to the output terminal /Q of the T-flip-flop 410.

A D-flip-flop 402 is coupled to synchronize the on/off signal $S_{LT}$ with the oscillation signal $P_{S1}$. The output terminal /Q of the D-flip-flop 402 is coupled to another input terminal of the NOR gate 436 to disable the switching signals A and B in response to a logic-low of the on/off signal $S_{LT}$. The output terminal Q of the D-flip-flop 402 is coupled to disable the synchronous signals $X_P$ via an AND gate 422. An input terminal of the AND gate 422 is coupled to the output terminal Q of the D-flip-flop 402. Another input terminal of the AND gate 422 is connected to the oscillation signal $P_{S3}$. An input terminal of a buffer 423 is connected to the oscillation signal $P_{S2}$. Therefore, the oscillation signals $P_{S2}$ and $P_{S3}$ are coupled to generate synchronous signals $X_P/X_N$ through the AND gate 422 and the buffer 423.

Figure 4:
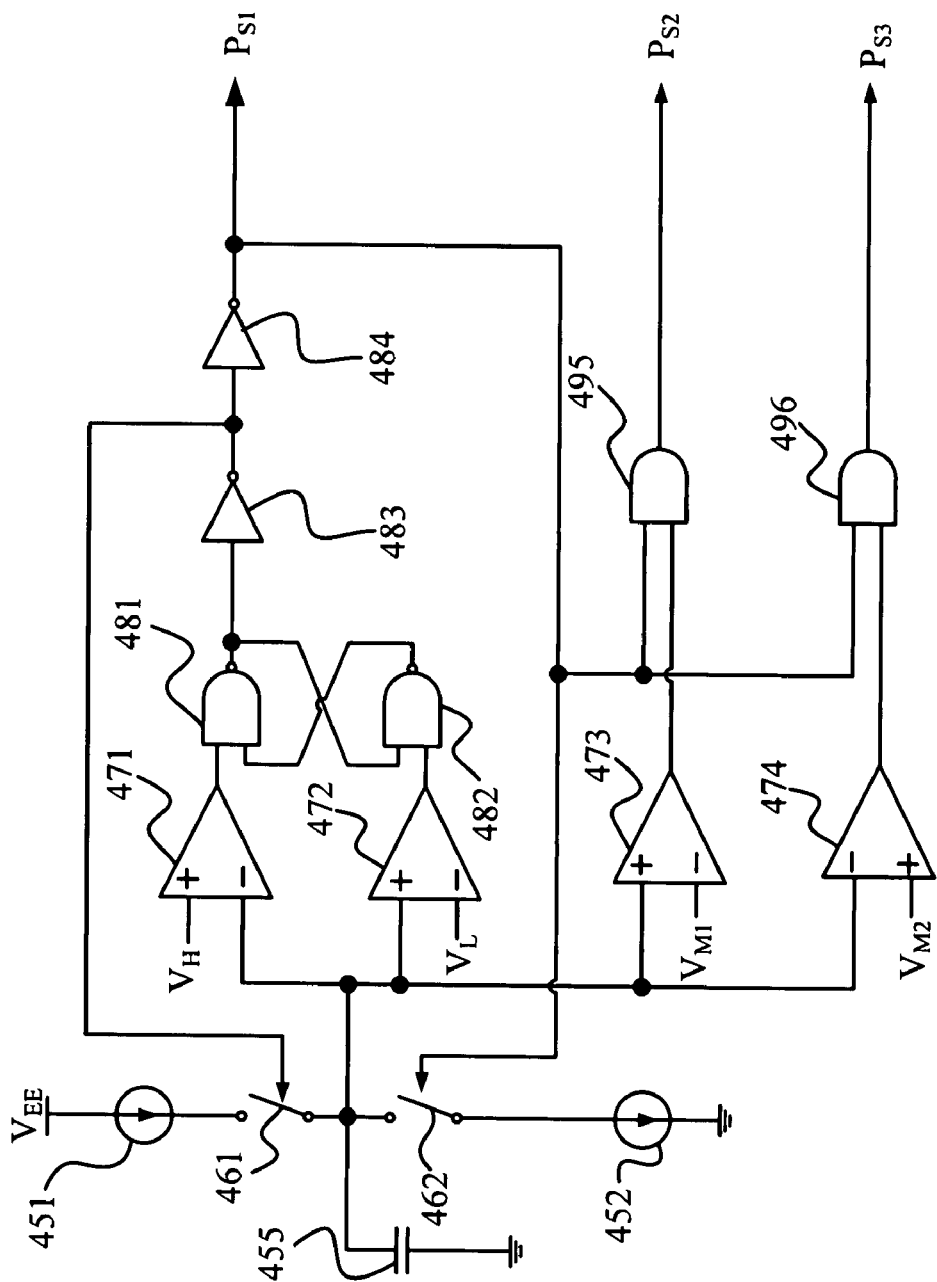
FIG. 4 is the circuit schematic of an oscillation circuit of the primary-side switching circuit according to the present invention.

FIG. 4 shows the oscillation circuit 450 of the primary-side switching circuit 40. It generates the oscillation signals $P_{S1}$, $P_{S2}$ and $P_{S3}$. A current source 451 is coupled to charge a capacitor 455 via a switch 461. The current source 451 is coupled to the power source $V_{EE}$. The switch 461 is coupled between the current source 451 and the capacitor 455. Another current source 452 is coupled to discharge the capacitor 455 through a switch 462. The current source 452 is coupled to the ground. The switch 462 is coupled between the current source 452 and the capacitor 455. A sawtooth signal is thus generated on the capacitor 455. The capacitor 455 is further connected to comparators 471, 472, 473 and 474. Comparators 471, 472, 473 and 474 have threshold voltages $V_H, V_L, V_{M1}$ and $V_{M2}$ respectively. NAND gates 481 and 482 develop a SR-latch coupled to the output terminals of the comparators 471 and 472. An output terminal of the NAND gate 481 generates a charge signal through an inverter 483. The charge signal is connected to control the switch 461. An output terminal of the inverter 483 is connected to another inverter 484 to generate the oscillation signal $P_{S1}$. The oscillation signal $P_{S1}$ is also coupled to control the switch 462 and AND gates 495, 496. An output terminal of the inverter 484 is coupled to the input terminals of the AND gates 495, 496. Another input terminal of the AND gate 495 is connected to an output terminal of the comparator 473 for generating the oscillation signal $P_{S2}$. Furthermore, another input terminal of the AND gate 496 is connected to an output terminal of the comparator 474 for generating the oscillation signal $P_{S3}$.

Figure 5:
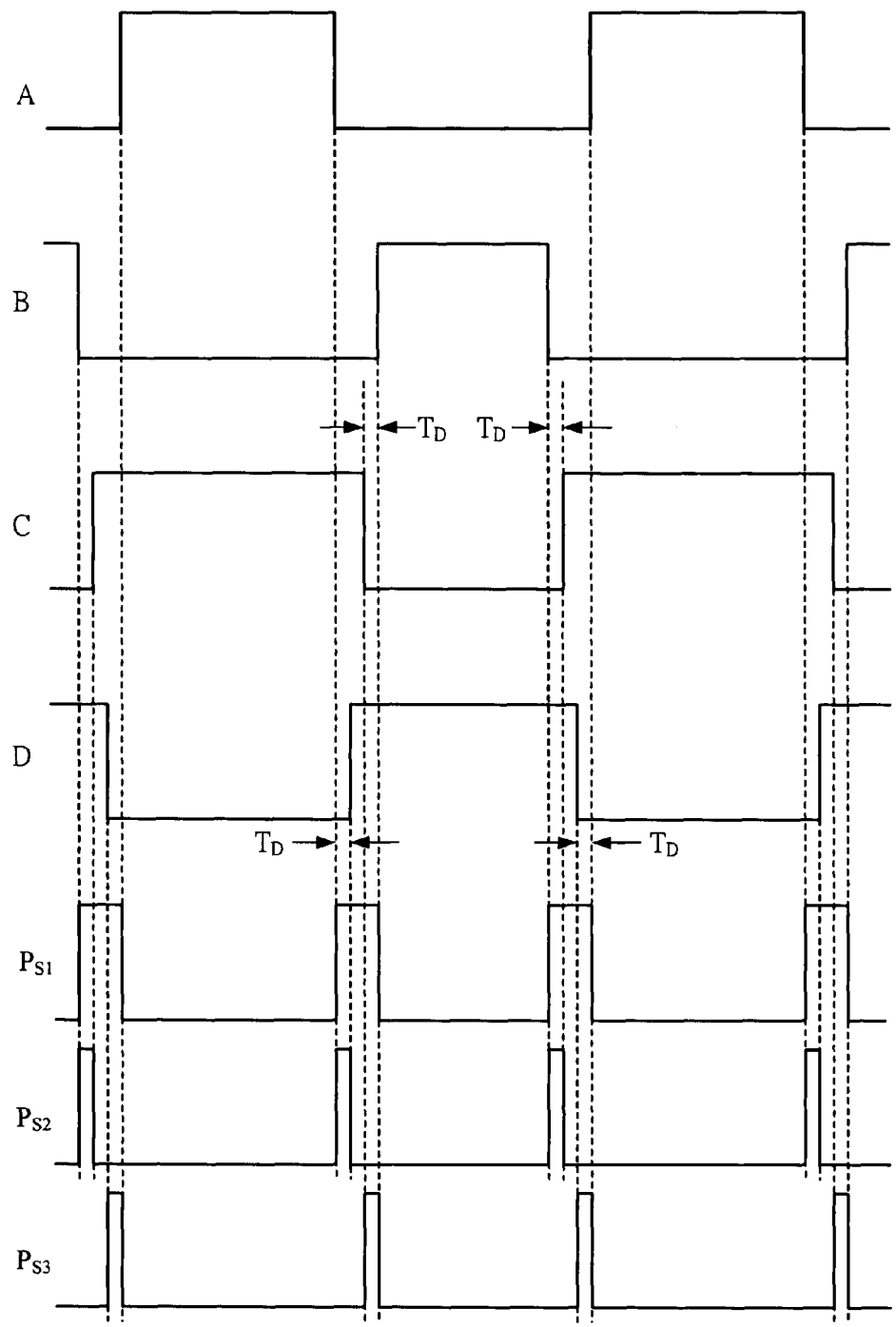
FIG. 5 shows switching signal and oscillation signal waveforms according to the present invention.
Figure 6:
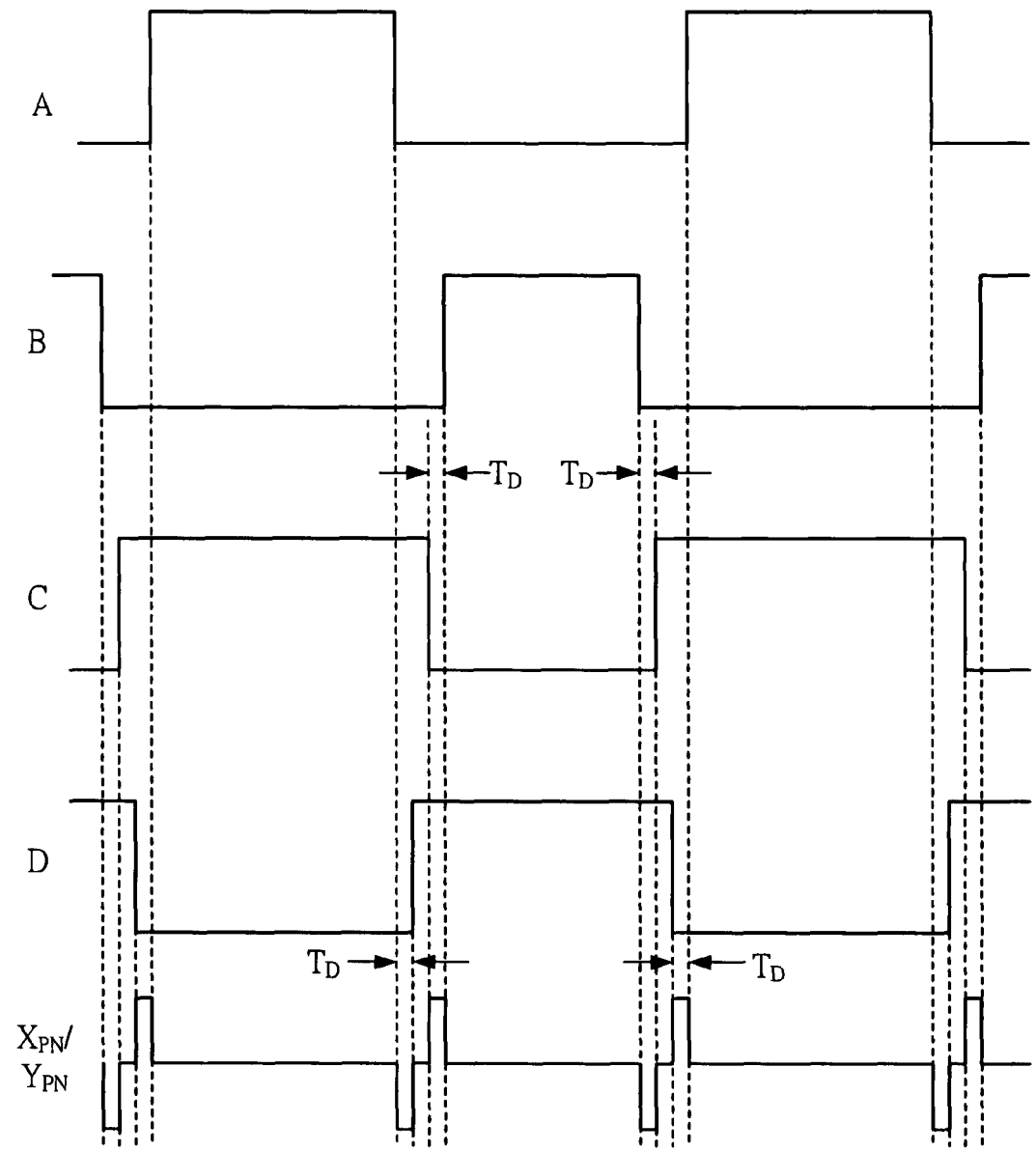
FIG. 6 shows switching signal and synchronous signal waveforms according to the present invention.

FIG. 5 shows the waveforms of switching signals A, B, C, D, and oscillation signals $P_{S1}$, $P_{S2}$, and $P_{S3}$. The oscillation signal $P_{S1}$ is a short-pulse signal that provides the dead time for switching signals A and B. The oscillation signal $P_{S2}$ is generated once the oscillation signal $P_{S1}$ is enabled. The oscillation signal $P_{S3}$ is generated after the oscillation signal $P_{S2}$ is disabled. The oscillation signal $P_{S3}$ is disabled in response to the disable of the oscillation signal $P_{S1}$. FIG. 6 shows the waveforms of switching signals A, B, C, D, and synchronous signals $X_{PN}/Y_{PN}$ ($X_P/X_N$ and $Y_P/Y_N$). A negative-polarity synchronous signal $X_{PN}/Y_{PN}$ is generated in response to the turning off of the switching signals A and B. A positive-polarity synchronous signal $X_{PN}/Y_{PN}$ is generated before the turning on of the switching signals A and B. The pulse width of the synchronous signals $X_{PN}/Y_{PN}$ is correlated to the delay time $T_D$ of switching signals A, B, C and D. The delay time $T_D$ is thus developed between the switching signals A, B, C, D, and the synchronous signals $X_{PN}/Y_{PN}$.

Figure 7:
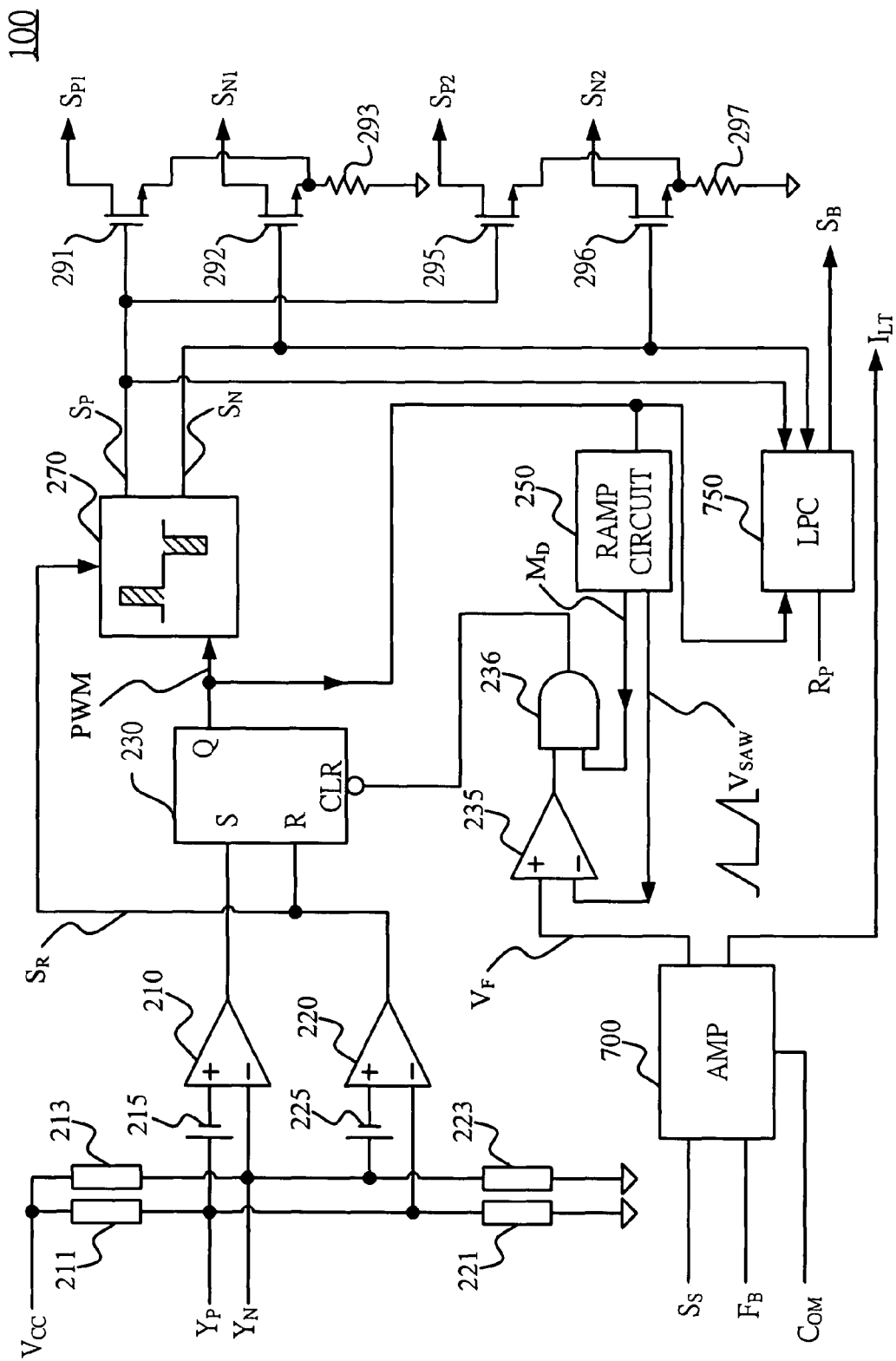
FIG. 7 is the circuit schematic of a secondary-side switching circuit according to the present invention.

FIG. 7 is the circuit schematic of the secondary-side switching circuit 100. Resistors 211, 221 and resistors 213, 223 provide bias termination for receiving the synchronous signals $Y_P/Y_N$. The resistors 211, 213 are coupled to the power source $V_{CC}$. The resistors 221, 223 are coupled to the ground. The resistor 211 is coupled to the resistor 221 in series. The resistor 213 is coupled to the resistor 223 in series. Synchronous signals $Y_P/Y_N$ are coupled to comparators 210 and 220. Comparators 210 and 220 have offset voltages 215 and 225 respectively, which produces hysteresis for the comparison. The output terminals of the comparators 210 and 220 are coupled to the input terminals of a SR-flip-flop 230. The SR-flip-flop 230, an AND gate 236 and a comparator 235 form a PWM circuit for generating a PWM signal at an output terminal Q of the SR-flip-flop 230 in response to the synchronous signals $Y_P/Y_N$. A clear-input terminal CLR of the SR-flip-flop 230 is controlled by an output of the AND gate 236. An input of the AND gate 236 is controlled by an output of the comparator 235. An amplification circuit 700 (AMP) including an error amplifier, a soft-start circuit and a power management circuit. The power management circuit generates the light-load signal $I_{LT}$ coupled to the primary-side switching circuit 40 to disable the switching signals A and B during the light load of the power converter. The error amplifier and the soft-start circuit generate an error signal $V_F$ in response to the feedback signal $F_B$ and a soft-start signal $S_S$. A ramp circuit 250 produces a ramp signal $V_{SAW}$ and a maximum-duty signal $M_D$ in response to the PWM signal. The error signal $V_F$ and the ramp signal $V_{SAW}$ are connected to the input terminals of the comparator 235. The output of the comparator 235 and the maximum-duty signal $M_D$ are connected to the input terminals of the AND gate 236 to generate a clear signal for disabling the PWM signal.

A pulse signal generator 270 is used for generating the pulse signals $S_P/S_N$ in accordance with the PWM signal and a signal $S_R$. The polarities of the pulse signals $S_P/S_N$ are determined by the PWM signal. The signal $S_R$ is the output of the comparator 220. Therefore, the PWM signal is enabled in response to synchronous signals $Y_P/Y_N$. The PWM signal is disabled in response to synchronous signals $Y_P/Y_N$ and the clear signal. The soft-start signal $S_S$ is coupled to control the pulse width of the PWM signal. Pulse signals $S_P/S_N$ are coupled to generate pulse signals $S_{P1}/S_{N1}$ through transistors 291 and 292 in differential mode. Pulse signals $S_P/S_N$ are further used to generate pulse signals $S_{P2}/S_{N2}$ through transistors 295 and 296 in differential mode. The resistors 293 and 297 are applied to limit the current of the transistors 291, 292 and 295, 296. The resistor 293 is coupled to the transistors 291, 293. The resistor 297 is coupled to the transistors 295, 296. Pulse signals $S_{P1}/S_{N1}$ and $S_{P2}/S_{N2}$ are differential signals. The polarity of the pulse signals $S_{P1}/S_{N1}$ and $S_{P2}/S_{N2}$ (active low) is opposite to the polarity of pulse signals $S_P/S_N$ (active high).

Furthermore, a linear-predict circuit 750 (LPC) is used for generating the drive signal $S_B$ to control the flyback switch 70 (shown in FIG. 1) in response to a program signal $R_P$ and the synchronous signals $Y_P/Y_N$. A programming device, such as the resistor 95 (shown in FIG. 1) is applied to generate the program signal $R_P$. The linear-predict circuit 750 is coupled to receive the PWM signal, the program signal $R_P$ and the pulse signals $S_P/S_N$.

Figure 8:
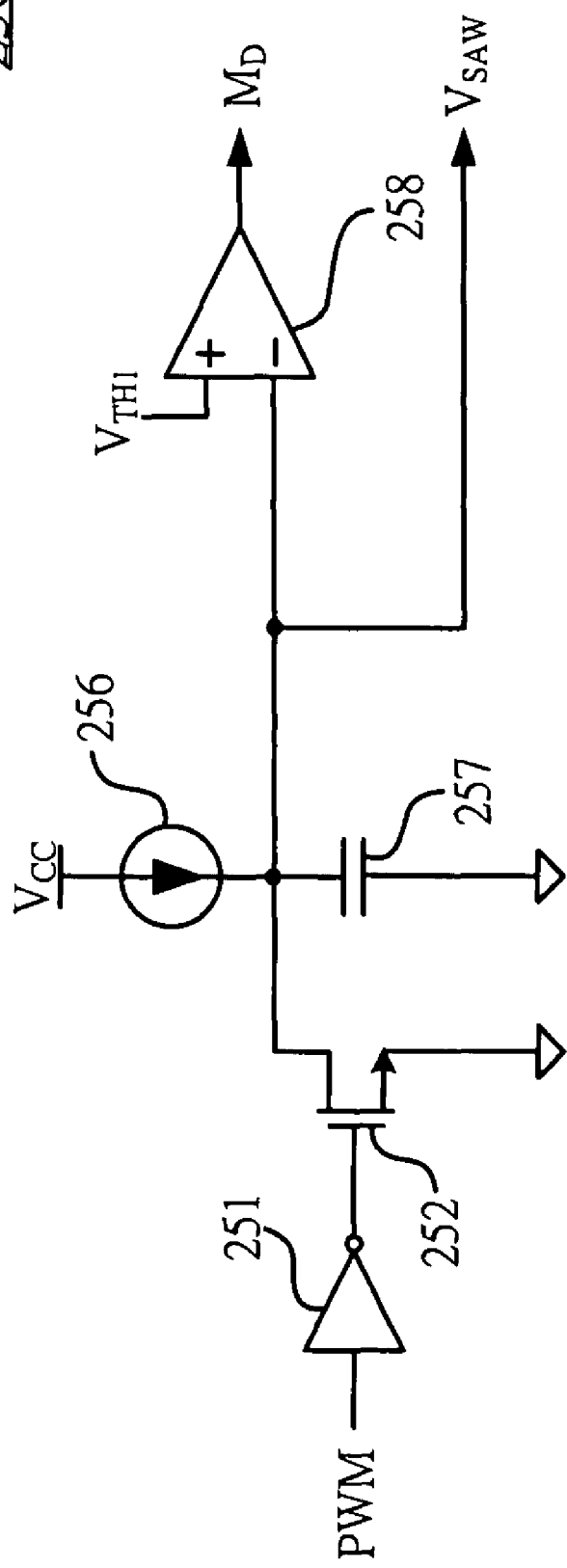
FIG. 8 is the circuit schematic of a ramp circuit according to the present invention.

FIG. 8 is the circuit schematic of the ramp circuit 250. A current source 256 coupled to the power source $V_{CC}$ is utilized to charge a capacitor 257 in response to the enable of the PWM signal. The PWM signal is connected to discharge the capacitor 257 through an inverter 251 and a transistor 252 when the PWM signal is disabled. The ramp signal $V_{SAW}$ is thus generated at the capacitor 257. A threshold voltage $V_{TH1}$ is connected to an input terminal of a comparator 258. Another input terminal of the comparator 258 is connected to the ramp signal $V_{SAW}$. An output terminal of the comparator 258 will generate the maximum-duty signal $M_D$ to disable the PWM signal once the ramp signal $V_{SAW}$ is higher than the threshold voltage $V_{TH1}$. Therefore, the maximum on time of the PWM signal is limited.

Figure 9:
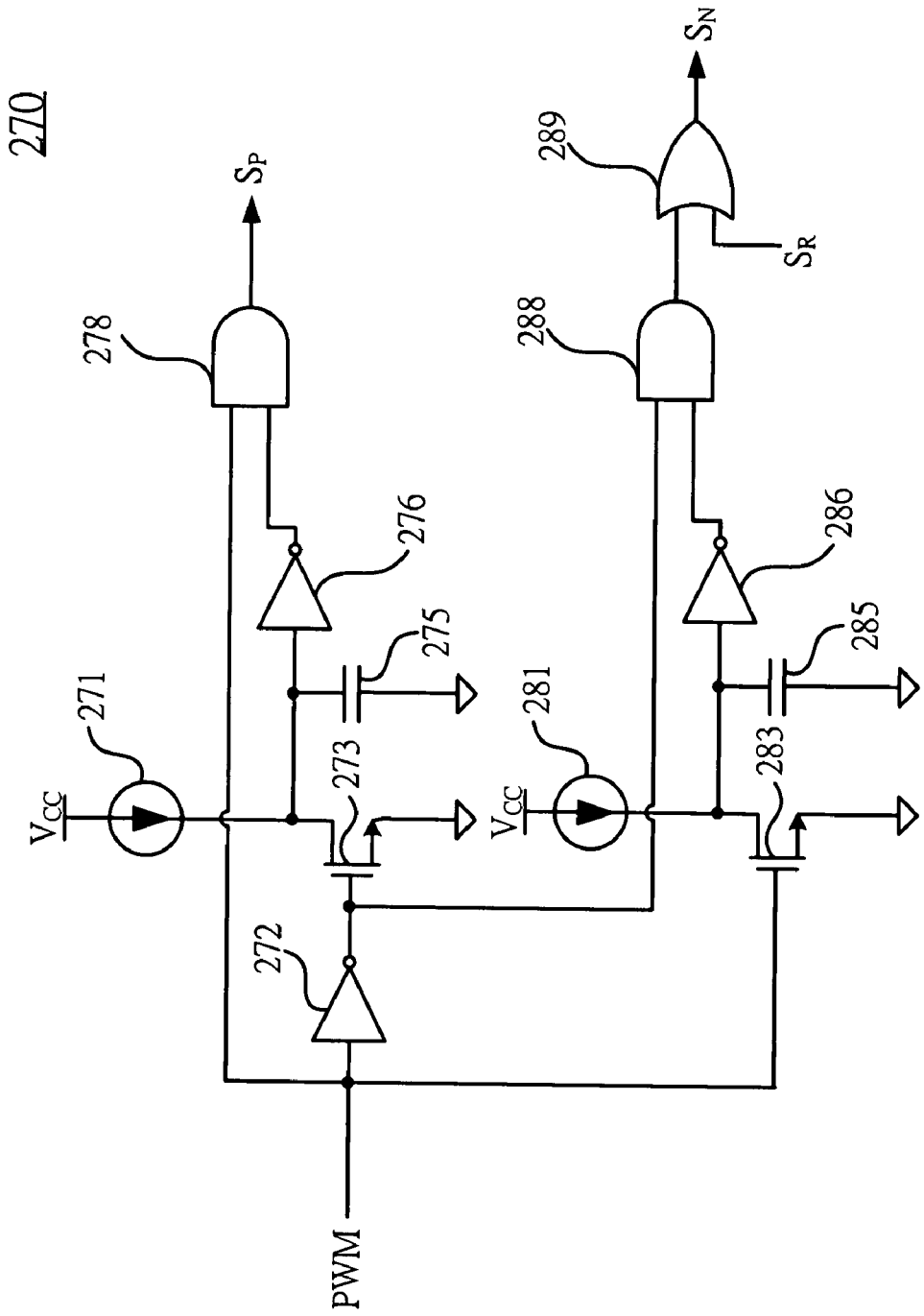
FIG. 9 is the circuit schematic of a pulse signal generator according to the present invention.

FIG. 9 shows the circuit of the pulse signal generator 270. The pulse signals $S_P/S_N$ are the differential signal. A positive-polarity pulse signal $S_P/S_N$ is generated in response to the rising edge of the PWM signal. A negative-polarity pulse signal $S_P/S_N$ is generated in response to the falling edge of the PWM signal and the signal $S_R$. Besides, the pulse signals $S_P/S_N$ are one-shot signal. The pulse width of the pulse signals $S_P/S_N$ are shorter than the pulse width of the switching signals A, B, C, D, which helps reducing the stress of transistors 291, 292, 295, 296 (shown in FIG. 7).

A current source 271 coupled to the power source $V_{CC}$ is connected to charge a capacitor 275. The PWM signal is coupled to discharge the capacitor 275 via an inverter 272 and a transistor 273 when the PWM is disabled. The capacitor 275 is connected to an input terminal of an inverter 276. The input terminals of an AND gate 278 are connected to an output terminal of the inverter 276 and the PWM signal. A current source 281 coupled to the power source $V_{CC}$ is connected to charge a capacitor 285. The PWM signal is coupled to discharge the capacitor 285 through a transistor 283 when the PWM is enabled. The capacitor 285 is connected to an input terminal of an inverter 286. The input terminals of an AND gate 288 are connected to an output terminal of the inverter 286 and an output terminal of the inverter 272. An output terminal of the AND gate 288 and the signal $S_R$ is connected to the input terminals of an OR gate 289. An output terminal of the AND gate 278 and an output terminal of the OR gate 289 generate the pulse signals $S_P/S_N$. The pulse widths of the pulse signals $S_P/S_N$ are determined by the current of current sources 271, 281 and the capacitance of the capacitors 275, 285.

Figure 10:
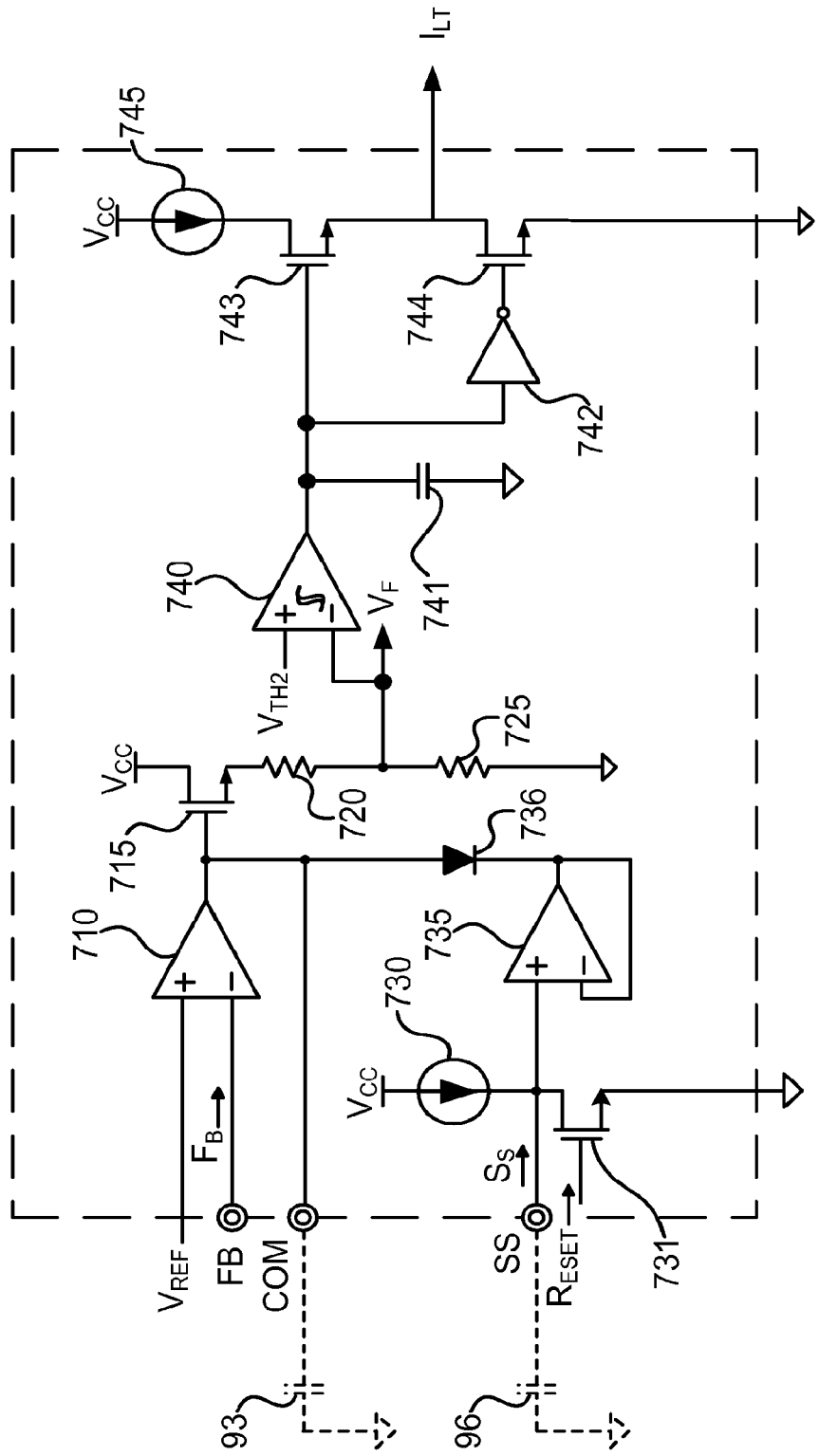
FIG. 10 is the circuit schematic of an amplification circuit according to the present invention.

FIG. 10 shows the amplification circuit 700. The error amplifier includes an operational amplifier 710, a level-shift transistor 715 and resistors 720, 725. The soft start circuit is developed by a current source 730, a discharge transistor 731, an unit-gain buffer 735 and a diode 736. A comparator 740, a capacitor 741, an inverter 742, a current source 745 and transistors 743, 744 form the power management circuit.

A reference voltage $V_{REF}$ and the feedback signal $F_B$ are coupled to input terminals of the operational amplifier 710. The operational amplifier 710 is a trans-conductance amplifier. The operational amplifier 710 has the output terminal COM connected to the capacitor 93 for the loop compensation. The output terminal COM is further controlled by the unit-gain buffer 735 through the diode 736. The diode 736 is coupled between the output terminal COM of the operational amplifier 710 and an output terminal of the unit-gain buffer 735. An input terminal of the unit-gain buffer 735 is coupled to the soft-start signal $S_S$. Another input terminal of the unit-gain buffer 735 is coupled to the output terminal of the unit-gain buffer 735. The current source 730 associates with the capacitor 96 generates the soft-start signal $S_S$. The current source 730 is coupled to the power source $V_{CC}$.

The discharge transistor 731 is coupled to the capacitor 96. The discharge transistor 731 is used to discharge the capacitor 96 in response to a system reset signal $R_{ESET}$ of the secondary-side switching circuit 100 (shown in FIG. 1). Therefore, the soft-start circuit will generate the soft-start signal $S_S$ in response to the system reset signal $R_{ESET}$. The level-shift transistor 715 and resistors 720, 725 provide level shift and attenuation to the output signal of the operational amplifier 710. The error signal $V_F$ is generated at the resistor 725. The level-shift transistor 715 is coupled to the power source $V_{CC}$ and the output terminal COM of the operational amplifier 710. The resistors 720, 725 are coupled to the level-shift transistor 715 in series.

A threshold signal $V_{TH2}$ is connected to a positive input terminal of the comparator 740. A negative input terminal of the comparator 740 is coupled to receive the error signal $V_F$. A power-management signal will be generated at an output terminal of the comparator 740 once the error signal $V_F$ is lower than the threshold signal $V_{TH2}$. The enable of the power-management signal shows the light load of the power converter. A capacitor 741 is connected to the output terminal of the comparator 740 for providing a debounce. The enable of the power-management signal will turn on the transistor 743 and turn off the transistor 744 through the inverter 742, and enable the light-load signal $I_{LT}$. The light-load signal $I_{LT}$ is correlated to the current of the current source 745. The inverter 742 is coupled between the output terminal of the comparator 740 and the transistor 744. The transistor 743 is coupled to the output terminal of the comparator 740 and the current source 745. The transistors 743, 744 are coupled together and generate the light-load signal $I_{LT}$. The current source 745 is coupled to the power source $V_{CC}$.

Figure 11:
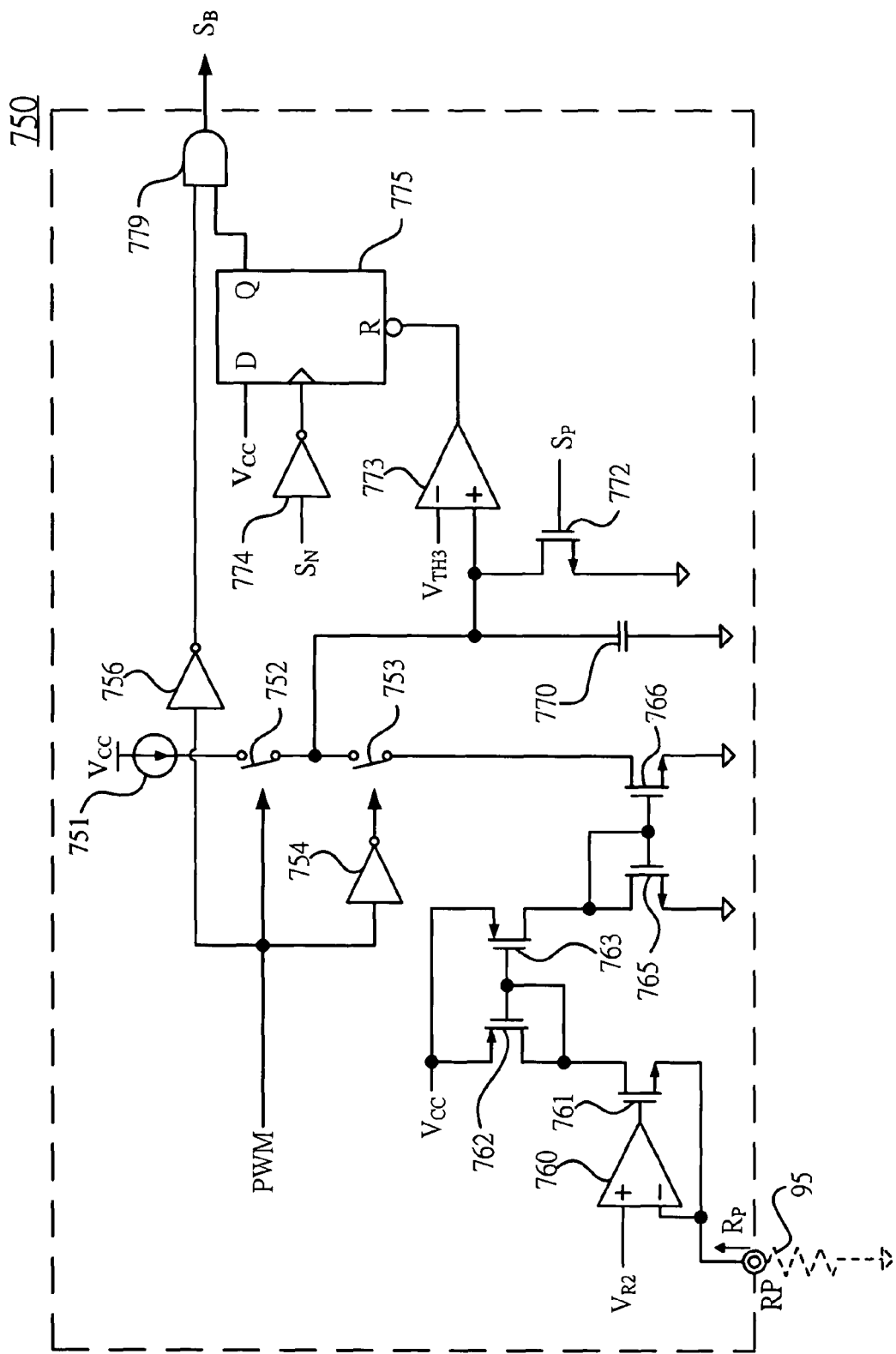
FIG. 11 is the circuit schematic of a linear-predict circuit according to the present invention.

FIG. 11 is the detailed circuit schematic of linear-predict circuit 750 of the secondary-side switching circuit 100. The linear-predict circuit 750 is developed to turn off the flyback switch 70 (shown in FIG. 1) when the power converter is operated in the discontinuous current mode. Turning off the flyback switch 70 will prevent a reverse current flowed from the output capacitor 85 (shown in FIG. 1) to the flyback switch 70 during the discontinuous current mode. A current source 751 is coupled to charge a capacitor 770 via a switch 752. The current source 751 is coupled to the power source $V_{CC}$. The switch 752 is coupled between the current source 751 and the capacitor 770. A discharge-current is coupled to discharge the capacitor 770 through a switch 753. The PWM signal is coupled to control the switch 752. The PWM signal is further coupled to control the switch 753 via an inverter 754.

An operational amplifier 760, the resistor 95 (shown in FIG. 1) and transistors 761, 762, 763, 765 and 766 develop a voltage-to-current converter. An input terminal of the operational amplifier 760 is coupled to receive the program signal $R_P$ for generating the discharge-current at the transistor 766. The program signal $R_P$ is generated in accordance with a reference voltage $V_{R2}$ and the resistance of the resistor 95. The reference voltage $V_{R2}$ is coupled to another input terminal of the operational amplifier 760. An output terminal and the input terminal of the operational amplifier 760 are coupled to the transistor 761. The transistors 762, 763 develop a current mirror and coupled to the transistor 761. The transistors 765, 766 develop another current mirror and coupled to the transistor 763 to generate the discharge-current.

The capacitor 770 is charged in response to the enable of the PWM signal, and discharged in response to the disable of the PWM signal. Additionally, the pulse signal $S_P$ is coupled to discharge the capacitor 770 via a transistor 772. The transistor 772 is coupled to the capacitor 770 and the pulse signal $S_P$. A linear-predict signal is thus generated in the capacitor 770. The pulse signal $S_N$ is coupled to enable a D-flip-flop 775 through an inverter 774. The inverter 774 is coupled between the pulse signal $S_N$ and the D-flip-flop 775. The PWM signal and the output of the D-flip-flop 775 are connected to enable an AND gate 779 for producing the drive signal $S_B$ once the PWM signal is disabled.

An inverter 756 is coupled between the PWM signal and an input terminal of the AND gate 779. An output terminal Q of the D-flip-flop 775 is coupled to another input terminal of the AND gate 779. An input terminal D of the D-flip-flop 775 is coupled to the power source $V_{CC}$. A reset-input terminal R of the D-flip-flop 775 is connected to an output terminal of a comparator 773. A threshold voltage $V_{TH3}$ is connected to a negative input terminal of the comparator 773. A positive input terminal of the comparator 773 is connected to the capacitor 770 to receive the linear-predict signal. When the linear-predict signal is lower than the threshold voltage $V_{TH3}$, the comparator 773 will reset the D-flip-flop 775 to disable the drive signal $S_B$. The drive signal $S_B$ is therefore generated in response to the program signal $R_P$ and the pulse width of the PWM signal.

When the power converter operated in the boundary mode, the magnetized flux $\Phi_C$ of the inductor 80 (shown in FIG. 1) is equal to its demagnetized flux $\Phi_D$. The boundary mode means the power converter is operated between the continuous current mode and the discontinuous current mode.

The equality is shown as, $$\Phi_C = \Phi_D \quad (3)$$

$$\Phi = B \times Ae = \frac{V \times T}{N} \quad (4)$$

$$\left[\left(\frac{V_{IN} \times N_S}{N_P}\right) - V_O\right] \times T_{CHARGE} = V_O \times T_{DISCHARGE} \quad (5)$$

$$T_{DISCHARGE} = \left\{\left[\left(\frac{V_{IN} \times N_S}{N_P}\right) - V_O\right] \Big/ V_O\right\} \times T_{CHARGE} \quad (6)$$

$$T_{DISCHARGE} = K \times T_{CHARGE} \quad (7)$$

where B is the flux density; Ae is the cross-section area of the inductor 80; $N_S/N_P$ is the turn ratio of the transformer 10; the magnetized time ($T_{CHARGE}$) is the pulse width of the PWM signal; the demagnetized time ($T_{DISCHARGE}$) of the inductor 80 indicates the boundary condition of the magnetizing and demagnetizing.

Figure 12:
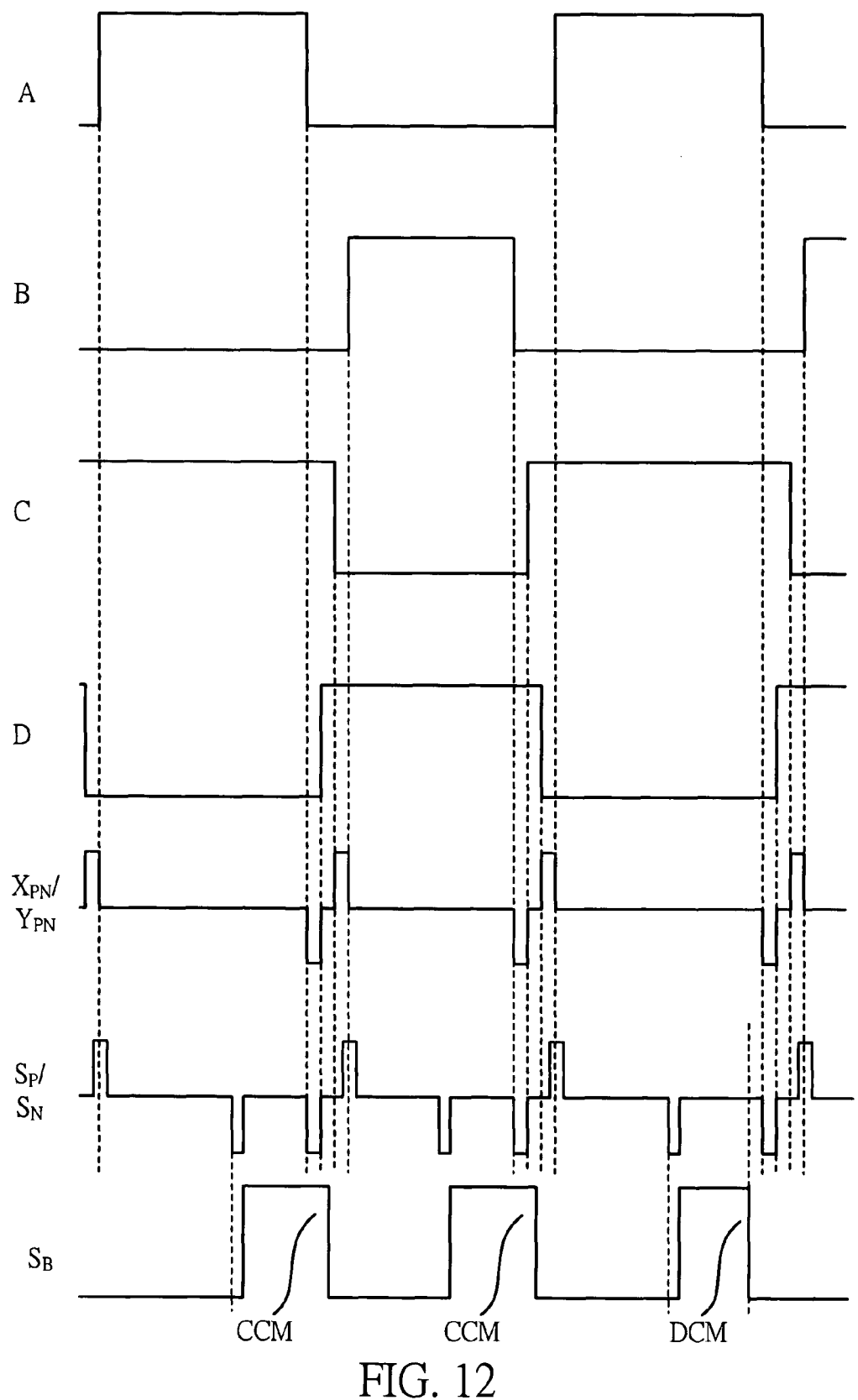
FIG. 12 shows switching signals, synchronous signals, pulse signals and a drive signal waveforms according to the present invention.

The demagnetized time $T_{DISCHARGE}$ of the inductor 80 can be obtained in accordance with the equation (6). It also shows the demagnetized time $T_{DISCHARGE}$ can be predicted in accordance with the input voltage $V_{IN}$ (shown in FIG. 1), the output voltage $V_O$ (shown in FIG. 1) and the magnetized time $T_{CHARGE}$ (the pulse width of the PWM signal). If the input voltage $V_{IN}$ and the output voltage $V_O$ can be set as constant, the demagnetized time $T_{DISCHARGE}$ could be predicted by the equation (7), in which the K value is programmed by the program signal $R_P$. Therefore, the on time of the drive signal $S_B$ can be generated in accordance with the demagnetized time $T_{DISCHARGE}$ shown in the equation (7). FIG. 12 shows waveforms of switching signals A, B, C, D, synchronous signals $X_{PN}/Y_{PN}$, pulse signals $S_P/S_N$ and the drive signal $S_B$. The drive signal $S_B$ is disabled before the power converter operated in the discontinuous current mode (the inductor 80 is fully demagnetized).

Figure 13:
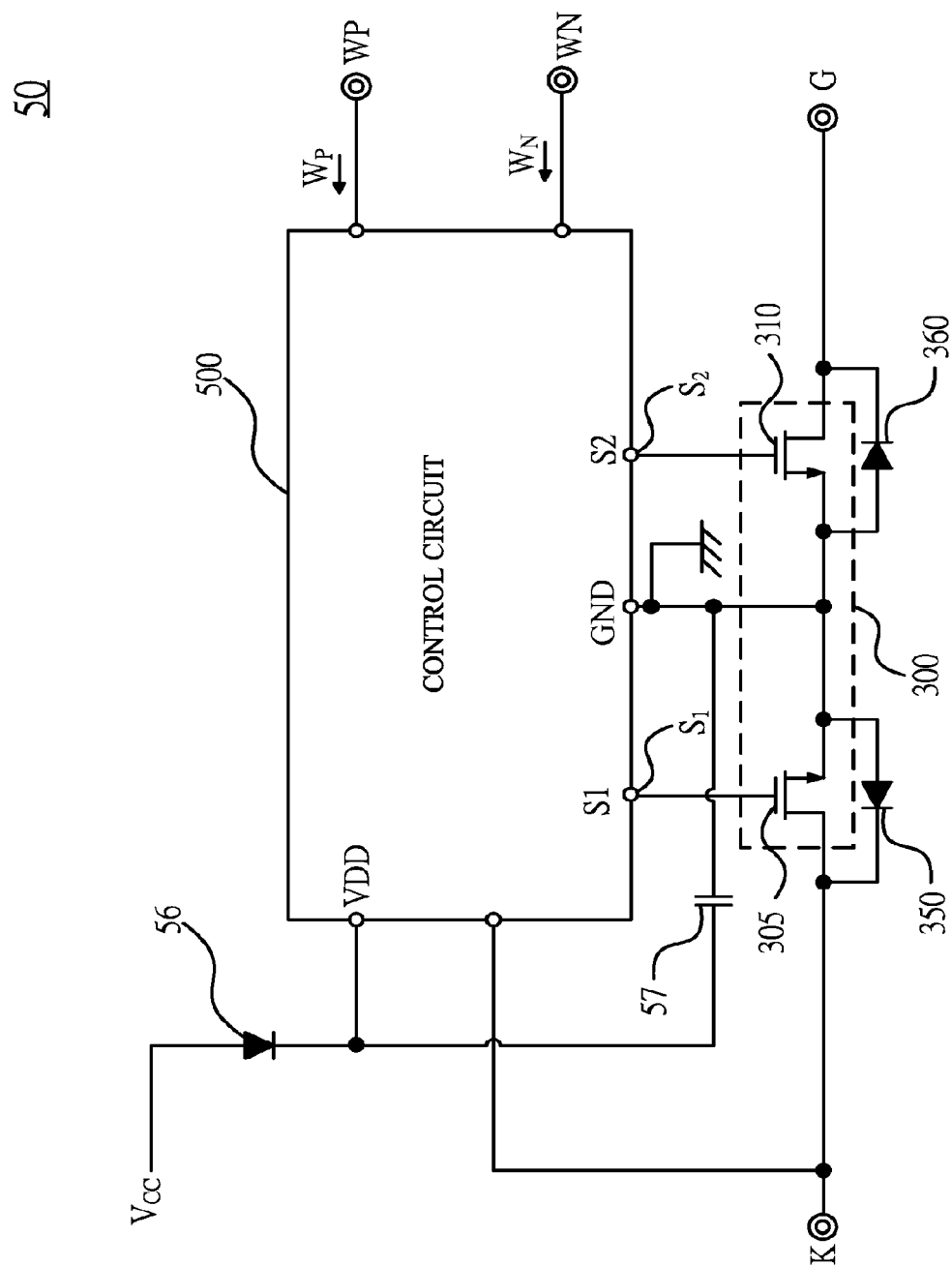
FIG. 13 is the circuit schematic of a synchronous switch according to the present invention.

FIG. 13 is the circuit schematic of a synchronous rectifier 50 that is also the synchronous switch. It represents the circuit of synchronous switches 51 and 52 shown in FIG. 1. The synchronous switches 51 and 52 serve to the synchronous rectifiers. The synchronous rectifier 50 includes power switch 300 having transistors 305, 310, diodes 350, 360, 56, a capacitor 57 and a control circuit 500. The first diode 350 is connected to the first transistor 305 in parallel. The second diode 360 is connected to the second transistor 310 in parallel. Transistors 305 and 310 are connected in series and back-to-back. Transistors 305 and 310 are further connected between the terminal K and the terminal G. The terminal K is coupled to the secondary side of the transformer 10 (shown in FIG. 1). The terminal K serves to a rectifying terminal. The terminal G is coupled to the output terminal of the power converter.

A first input terminal and a second input terminal of the control circuit 500 are coupled to receive the pulse signals $S_{P1}/S_{N1}$ or $S_{P2}/S_{N2}$ for generating pulse signals $W_P/W_N$ and gate-drive signals $S_1$, $S_2$. The gate-drive signals $S_1$, $S_2$ serve to a first-control signal and a second-control signal respectively. Gate-drive signals $S_1$ and $S_2$ are couple to turn on/off the transistors 305 and 310 respectively. The diode 56 and the capacitor 57 form a charge-pump circuit to provide the power supply to the control circuit 500. The power source $V_{CC}$ is connected to charge the capacitor 57 through the diode 56. A VDD terminal and GND terminal of the control circuit 500 are parallel connected to the capacitor 57. The GND terminal is further connected to the sources of the transistors 305 and 310 and the ground.

Figure 14:
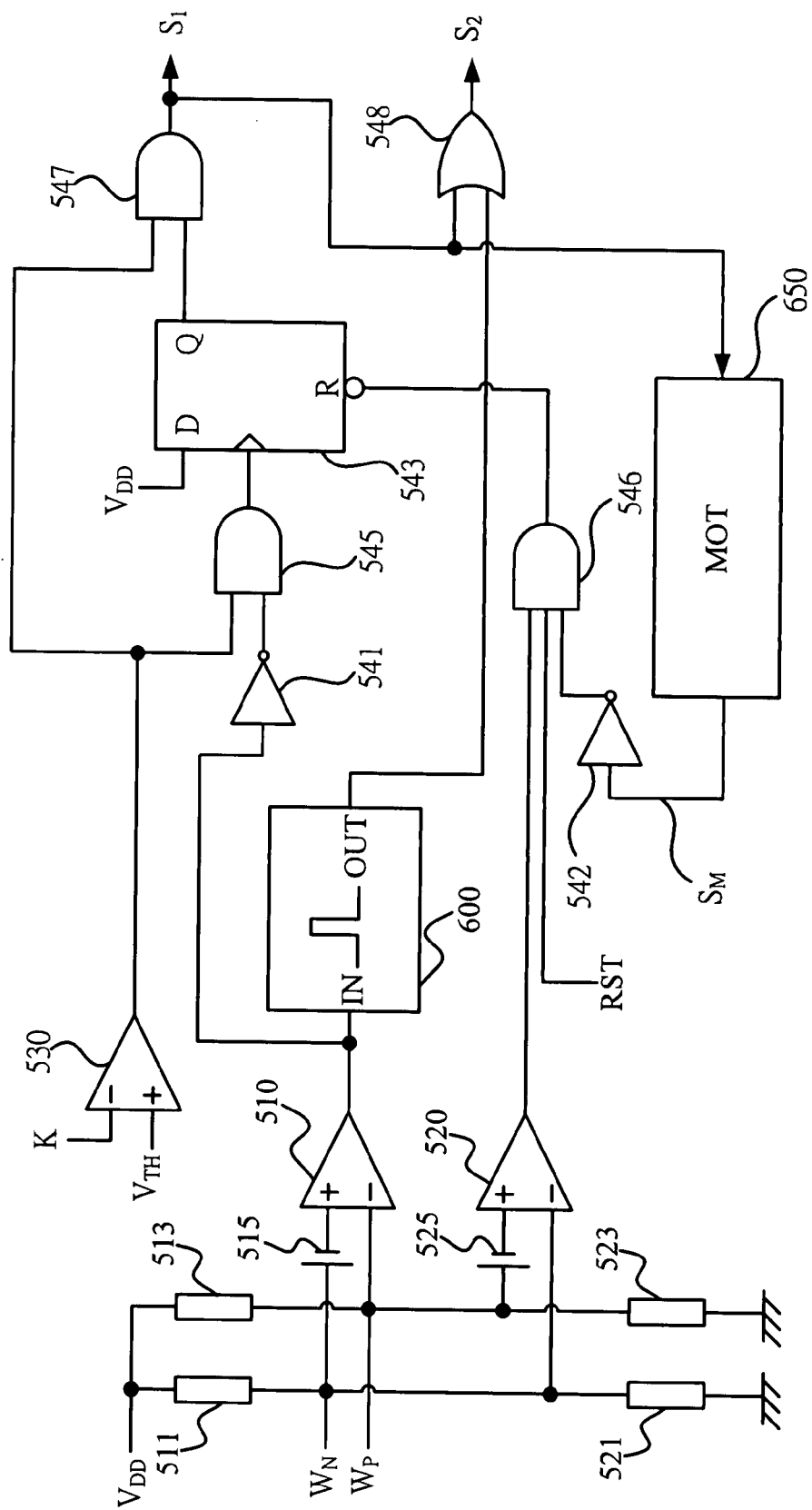
FIG. 14 is the circuit schematic of a preferred embodiment of a control circuit of the synchronous switch according to the present invention.

FIG. 14 is a preferred embodiment of the control circuit 500. Resistors 511, 521 and 513, 523 provide the bias termination for receiving the pulse signals $W_P/W_N$. The resistors 511, 513 are coupled to the power source $V_{DD}$. The resistors 521, 523 are coupled to the ground. The resistor 511 is coupled to resistor 521 in series. The resistor 513 is coupled to resistor 523 in series. The pulse signals $W_P/W_N$ are coupled to comparators 510 and 520. Comparators 510 and 520 have offset voltages 515 and 525 respectively, which produces hysteresis for the comparison. A comparator 530 having a threshold $V_{TH}$ connects to its positive input terminal. A negative input terminal of the comparator 530 is coupled to the terminal K.

An output terminal of comparator 510 is coupled to enable a D-flip-flop 543 through an inverter 541 and an AND gate 545. The D-flip-flop 543 is operated as a latch circuit to receive the pulse signals $W_P/W_N$ for set or reset the latch circuit in response to the polarity of the pulse signals $W_P/W_N$. The inverter 541 is coupled between the output terminal of the comparator 510 and an input terminal of the AND gate 545. Another input terminal of the AND gate 545 is connected to an output terminal of the comparator 530. An input terminal D is coupled to the power source $V_{DD}$. A reset-input terminal R of the D-flip-flop 543 is controlled by an output of the comparator 520 via an AND gate 546. An output terminal Q of the D-flip-flop 543 and the output terminal of the comparator 530 are connected to input terminals of an AND gate 547. The gate-drive signal $S_1$ is generated at an output terminal of the AND gate 547 for controlling the on/off of the first transistor 305 (shown in FIG. 13). Therefore, the on/off of the first transistor 305 is controlled in accordance with the status of the D-flip-flop 543.

The maximum on time of the gate-drive signal $S_1$ is limited by a maximum-on-time circuit 650 (MOT). The gate-drive signal $S_1$ is connected to the maximum-on-time circuit 650. After a blanking time, a maximum-on-time signal $S_M$ will be produced in response to the enable of the gate-drive signal $S_1$. The maximum-on-time signal $S_M$ is connected to a first input terminal of the AND gate 546 via an inverter 542. The second input terminal of the AND gate 546 is connected to a power-on reset signal RST. The third input terminal of the AND gate 546 is connected to the output terminal of the comparator 520. An output terminal of the AND gate 546 is couple to reset the D-flip-flop 543. The maximum on time of the gate-drive signal S₁ is thus limited by the blanking time of the maximum-on-time circuit 650. The gate-drive signal S₁ will be generated to turn off the first transistor 305 once the pulse signal W_P/W_N (active low) is generated as, $$V_{WP} - V_{WM} > V_{525} \quad (8)$$

The gate-drive signal S₁ will turn on the first transistor 305 when equations (9) and (10) are met, $$V_{WN} - V_{WP} > V_{515} \quad (9)$$

$$V_K < V_{TH} \quad (10)$$

where $V_{WP}$ and $V_{WN}$ is the voltage of pulse signals $W_P/W_N$; $V_K$ is the voltage of the terminal K; $V_{TH}$ is the voltage of the threshold $V_{TH}$; $V_{515}$ is the value of the offset voltage 515; $V_{525}$ is the value of the offset voltage 525.

The voltage of the terminal K will be lower than the voltage of the threshold $V_{TH}$ once the first diode 350 (shown in FIG. 13) is conducted. The first transistor 305 can only be turned on after the first diode 350 is turned on, which synchronizes the switching and the polarity of the transformer 10 (shown in FIG. 1), and achieves the soft switching of the first transistor 305. Another gate-drive signal S₂ is generated at an output terminal of an OR gate 548 for switching the on/off of the second transistor 310 (shown in FIG. 13). An input terminal of the OR gate 548 is connected to the gate-drive signal S₂. Another input terminal of the OR gate 548 is controlled by a one-shot signal generator 600. An input terminal of the one-shot signal generator 600 is connected to the output terminal of the comparator 510. Therefore, the gate-drive signal S₂ is generated in response to the pulse signals W_P/W_N. After that, the on/off of the gate-drive signal S₂ is corresponding to the gate-drive signal S₁.

Figure 15:
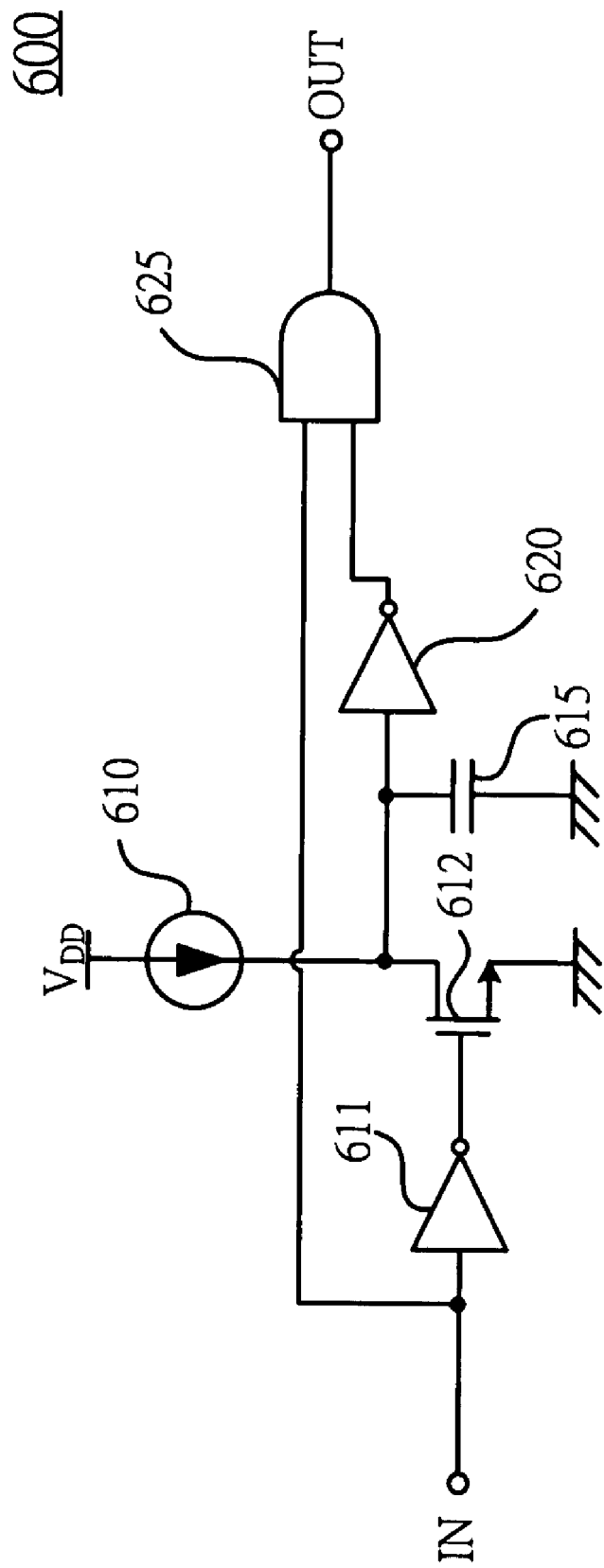
FIG. 15 is the circuit schematic of a one-shot signal generator according to the present invention.

FIG. 15 shows the circuit schematic of the one-shot signal generator 600. A current source 610 is connected to charge a capacitor 615. The current source 610 is coupled to the power source V_DD. A transistor 612 is connected to discharge the capacitor 615. The input signal is coupled to control the transistor 612 through an inverter 611. The input signal is further connected to an input terminal of an AND gate 625. Another input terminal of the AND gate 625 is coupled to the capacitor 615 via an inverter 620. An output terminal of the AND gate 625 generates the output signal of the one-shot signal generator 600. The output signal of the one-shot signal generator 600 is the one-shot signal. When the input signal is a logic-low, the capacitor 615 is discharged and the output terminal of the AND gate 625 is the logic-low. When the input signal is changed to the logic-high, the current source 610 will start to charge the capacitor 615. The AND gate 625 will output the one-shot signal. The current of the current source 610 and the capacitance of the capacitor 615 determine the pulse width of the one-shot signal.

Figure 16:
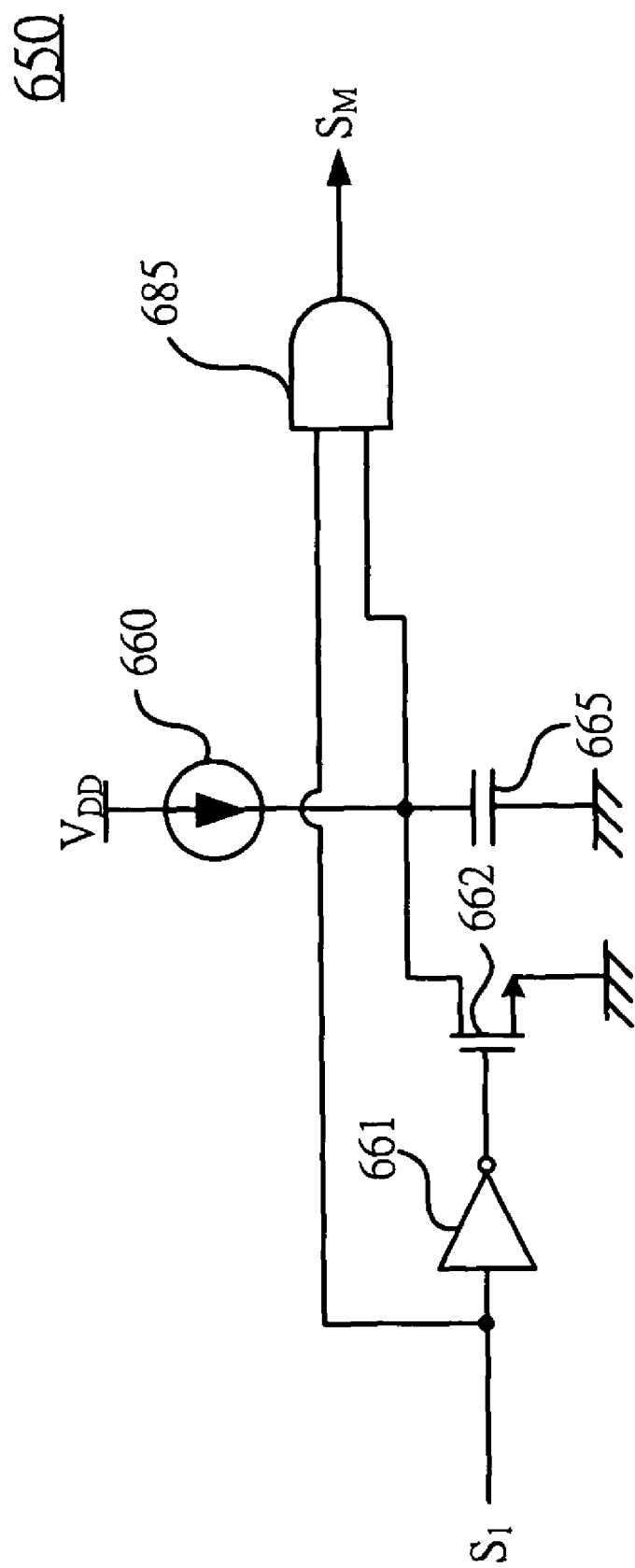
FIG. 16 is the circuit schematic of a maximum-on-time (MOT) circuit according to the present invention.

FIG. 16 is a maximum-on-time (MOT) circuit 650. A current source 660 is connected to charge a capacitor 665. The current source 660 is coupled to the power source V_DD. A transistor 662 is connected to discharge the capacitor 665. The gate-drive signal S₁ is coupled to control the transistor 662 through an inverter 661. The gate-drive signal S₁ is further connected to an input terminal of an AND gate 685. Another input terminal of the AND gate 685 is coupled to the capacitor 665. Once the gate-drive signal S₁ is enabled, an output terminal of the AND gate 685 will generate the maximum-on-time signal S_M to disable the gate-drive signal S₁ after the blanking time. The blanking time is determined by the current of the current source 660 and the capacitance of the capacitor 665.

Figure 17:
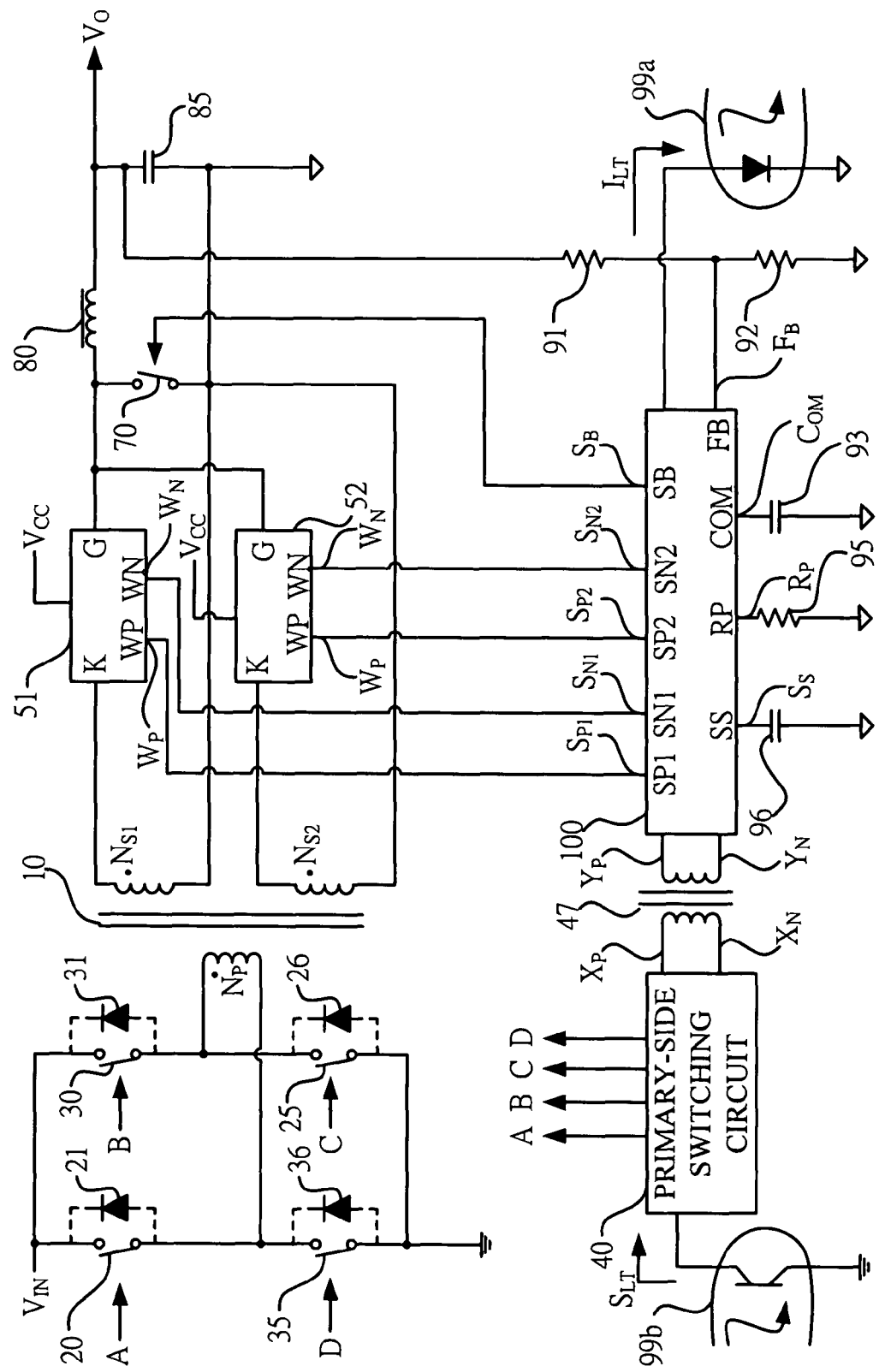
FIG. 17 shows a preferred embodiment of a power converter with synchronous regulation circuit according to the present invention, in which a pulse transformer is operated as the isolation device.

FIG. 17 shows another preferred embodiment of a power converter with synchronous regulation circuit, wherein most circuit is the same as the last embodiment, so the description is omitted here. The difference is a pulse transformer 47 is operated as the isolation device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous regulation circuit for a power converter, comprising:
   a primary-side switching circuit generating a switching signal and a synchronous signal, the switching signal coupled to switch a transformer;
   a secondary-side switching circuit coupled to the output of the power converter to generate a pulse signal in response to the synchronous signal and a feedback signal;
   an isolation device coupled to the primary-side switching circuit for transferring the synchronous signal in the primary side of the transformer to the secondary-side switching circuit in the secondary side of the transformer; and
   a synchronous switch having a power switch and a control circuit, the power switch coupled in between the secondary side of the transformer and the output of the power converter, the control circuit receiving the pulse signal for turning on/off the power switch;
   wherein the feedback signal is correlated to the output of the power converter, the pulse signal is a differential signal generated for rectifying and regulating of the power converter, the polarity of the pulse signal determines the on/off of the power switch.

2. The synchronous regulation circuit as claimed in claim 1, wherein the pulse signal is coupled from the secondary-side switching circuit to the synchronous switch through two transistors operated in differential mode.

3. The synchronous regulation circuit as claimed in claim 1, further comprising:
   a flyback switch coupled to the synchronous switch and the output of the power converter;
   wherein the flyback switch is turned on in response to the off of the power switch, an on time of the flyback switch is correlated to an on time of the power switch.

4. The synchronous regulation circuit as claimed in claim 1, wherein the power switch comprises a first transistor and a second transistor connected in series, the first transistor has a first diode connected in parallel, the second transistor has a second diode connected in parallel.

5. The synchronous regulation circuit as claimed in claim 4, wherein the control circuit generates a first-control signal and a second-control signal to control the first transistor and the second transistor respectively, the first transistor can be turned on once the first diode is conducted.

6. The synchronous regulation circuit as claimed in claim 1, wherein the isolation device is a pulse transformer or capacitors.

7. The synchronous regulation circuit as claimed in claim 1, wherein the primary-side switching circuit generates the synchronous signal in response to the switching signal, a delay time is developed between the switching signal and the synchronous signal.

8. The synchronous regulation circuit as claimed in claim 1, wherein the secondary-side switching circuit comprises:
a programming device generating a program signal; and
a linear-predict circuit generating a drive signal in response to the program signal and the synchronous signal;
wherein the drive signal is utilized to control a flyback switch.

9. The synchronous regulation circuit as claimed in claim 1, wherein the secondary-side switching circuit comprises:
a PWM circuit generating a PWM signal in response to the synchronous signal;
an error amplifier coupled to the output of the power converter to receive the feedback signal and generate an error signal;
a ramp circuit generating a ramp signal in response to the PWM signal; and
a pulse signal generator generating the pulse signal in accordance with the PWM signal;
wherein the PWM signal is enabled in response to the synchronous signal, the PWM signal is disabled in response to the synchronous signal and a clear signal, the clear signal is generated by the PWM circuit in response to the error signal and the ramp signal.

10. The synchronous regulation circuit as claimed in claim 9, wherein the secondary-side switching circuit further comprises:
a soft-start circuit generating a soft-start signal in response to a reset signal;
wherein the soft-start signal is coupled to control the pulse width of the PWM signal.

11. The synchronous regulation circuit as claimed in claim 9, wherein the secondary-side switching circuit further comprises:
a power management circuit coupled to receive the error signal for generating a light-load signal;
wherein the light-load signal is coupled to the primary-side switching circuit to disable the switching signal during the light load of the power converter.

12. The synchronous regulation circuit as claimed in claim 1, wherein the synchronous switch comprises:
a rectifying terminal coupled to the secondary side of the transformer;
a ground terminal coupled to the output of the power converter;
a first input terminal; and
a second input terminal;
wherein the power switch is connected in between the rectifying terminal and the ground terminal, the first input terminal and the second input terminal are coupled to receive the pulse signal for turning on/off the power switch.

13. The synchronous regulation circuit as claimed in claim 1, wherein the control circuit comprises a latch circuit coupled to receive the pulse signal for set or reset the latch circuit, the latch circuit is coupled to turn on/off the power switch.

14. A method for providing synchronous regulation of a power converter, comprising:
generating a synchronous signal;
generating a switching signal to switch a transformer;
generating a pulse signal in response to the synchronous signal and a feedback signal;
transferring the pulse signal to a latch circuit;
setting or resetting the latch circuit in response to the polarity of the pulse signal; and
turning on/off a power switch in accordance with the status of the latch circuit;
wherein the pulse signal is a one-shot differential signal, the feedback signal is correlated to the output of the power converter, the power switch is coupled in between the transformer and the output of the power converter for the rectifying and the regulation.

15. The method as claimed in claim 14, further comprising:
generating a program signal; and
generating a drive signal to turn on/off a flyback switch in response to the program signal and the synchronous signal;
wherein the flyback switch is coupled to the power switch and the output of the power converter.

16. The method as claimed in claim 14, further comprising:
generating an error signal in accordance with the feedback signal; and
generating a light-load signal by comparing the error signal with a threshold signal;
wherein the light-load signal is coupled to turn off the switching signal.

17. The method as claimed in claim 14, wherein a maximum on time of the power switch is limited by a maximum-on-time circuit.

* * * * *